Nov. 14, 1944.    H. S. JOACHIM    2,362,827
AUTOMATIC CONTROL FOR TORPEDOES
Filed June 23, 1943    2 Sheets-Sheet 1
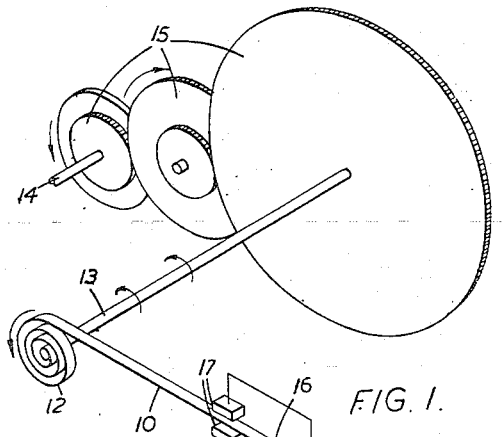
FIG. 1.
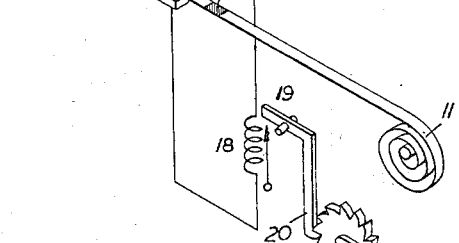
FIG. 2.
FIG. 3.
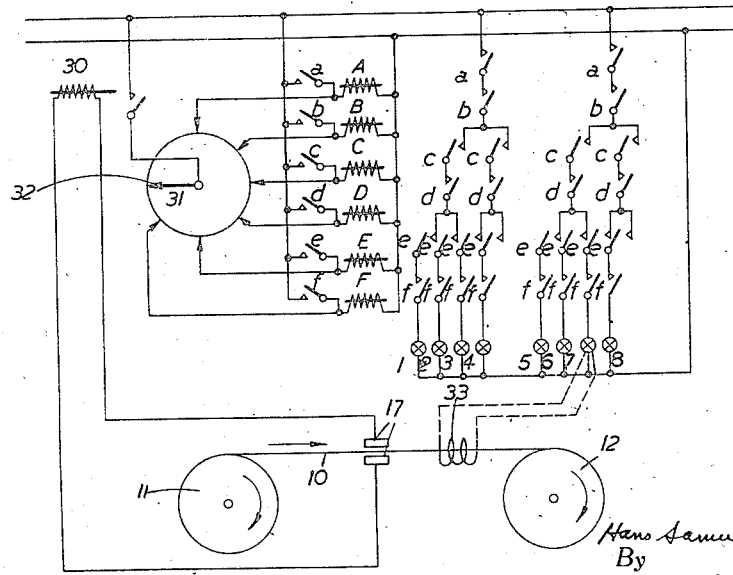
Inventor
Hans Samuel Joachim
By
Albert F. Nathan
Attorney Nov. 14, 1944.  H. S. JOACHIM  2,362,827
AUTOMATIC CONTROL FOR TORPEDOES
Filed June 23, 1943  2 Sheets-Sheet 2

Inventor
Hans Samuel Joachim
By
Albert F. Nathan
Attorney

Patented Nov. 14, 1944

2,362,827

UNITED STATES PATENT OFFICE 2,362,827

AUTOMATIC CONTROL FOR TORPEDOES

Hans Samuel Joachim, London, England

Application June 23, 1943, Serial No. 491,972
In Great Britain January 11, 1943

6 Claims. (Cl. 114—21)

The present invention relates to the automatic control of motor driven torpedoes or other power propelled craft or vehicles, and is especially advantageous for the automatic performance by such a vehicle of one or more changes in operation, such as an alteration in course or changes in speed, at one or a variety of predetermined points of its travel.

Now, in accordance with the invention, there is provided primarily a system for automatically controlling a power propelled vehicle of the character already indicated, wherein code-signal transmitting equipment incorporated with the vehicle, and by means of which code-signals recorded on prearranged parts of a signal-carrier can be brought successively into signal transmitting relation to a signal responsive device through movement of said carrier and device relatively to one another, has the carrier or the device or both arranged so as to be driven at a speed substantially at or proportional to the speed of travel of the vehicle, thereby to enable any one code-signal to be relayed through the signal responsive device and to initiate an operation, and/or a desired change or changes in the operation of the vehicle, such as anchoring, signalling or firing operation, or an alteration in course or changes in speed, automatically at a predetermined point in the course of travel of the vehicle corresponding to the prearranged position of the code-signal on the carrier.

Thus, the controlling signal or signals may be recorded on a carrier which is installed on the torpedo or other vehicle before the start thereof and transmitted to the controls of the torpedo or the craft by means of suitable appliances actuated or energized through the signal responsive device during the course of travel, the signal-carrier or the signal responsive device or both being moved in accordance with and in dependence on the distance traversed by the moving vehicle or craft.

Conveniently, the signal-carrier may be in the form of a wire or band coupled directly or indirectly with the motor or engine driving the torpedo or other craft or vehicle, so that, for instance, this band is uncoiled in accordance with the length of the course the vehicle has to cover, the velocity of such uncoiling being dependent on the speed of the vehicle to be controlled. By arranging for the signals recorded on the signal-carrier to pass one or a number of suitable signal responsive devices which may be termed pick-up devices, at moments defined in advance, an operation resulting in the course of the vehicle being altered, or any other desired operations, can therefore be effected at predetermined points in the course of travel.

It will be obvious that the signal-carrier can be driven by any means actuated by a moving member of the torpedo or other craft or vehicle itself provided that such drive is substantially at or proportional to the speed of travel of the vehicle.

The signal-carrier according to the invention may be formed of any of the materials used in the art of recording sound waves, as for instance of magnetizable steel wires, tapes or plates, light sensitive film-bands, insulating bands or plates e. g. paper bands having signals recorded thereon in the form of strips or points of electrically conductive material and from which the signals can be picked up through the closure of electric circuits effected by causing the conductive material to bridge a suitable contact, mechanically perforatable bands, in which the signals are recorded as perforations therein engageable by means such as an electric feeler device capable of completing an electric pick-up circuit or circuits, gramophone discs or plates, or bands carrying light-radiating materials. The particular manner in which the signals are recorded as also the form of pick-up devices should correspond to the kind of carrier chosen for the purpose.

Considering now the use of magnetizable wires or tapes as typical of a suitable signal-carrying material and probably the most resistant to rough handling and wear, the signal-carrier may have the signals recorded thereon by magnetisation therealong and this will more generally be done so that the signals are not so small or as close together as in speech recording. Moreover, for the sake of economy, the signal-carrier may be interrupted at suitable places by ordinary wire. If, for instance, a torpedo is wanted to turn to the left after having covered, say 3500 yards, the wire corresponding to the first 3000 yards may consist of ordinary wire. The signals which are to initiate the performance of the desired left turn are recorded on that part of the wire which will be passing by or through the pick-up device, when the amount of wire uncoiled by the motion of the torpedo represents a distance of 3500 yards.

The actual recording of the signal on the carrier can be made by a recording device independent of the craft to be controlled, the carrier with its record thereon being then placed in the torpedo and coupled directly or indirectly with the main propelling motor, or with any other device operating substantially dependently on the speed of the torpedo.

Alternatively the actual recording of the signal on the carrier may be effected inside the torpedo, the wire which is to bear the record being driven by means of a separate small motor, the speed of which is regulable, and which is preferably able to run in both directions, so that the recording and the subsequent coiling and uncoiling of the wire may be more easily effected. With such an arrangement it will be understood that suitable electrical connections from parts of the interior of the torpedo will be led to terminals or contacts provided on the exterior.

The control of the rate of movement of the wire in accordance with the speed of the torpedo can be effected not only by any suitable mechanical means but also electrically such as by causing the torpedo drive a shaft to drive a dynamo which in turn generates current sufficient to drive a motor coupled to a shaft by means of which the wire is driven.

The length of the wire to be used may equal the total length of the course to be covered by the craft to be controlled, but it is quite feasible to reduce the length of the wire, for instance in the ratio 1:20; the signals can be recorded very accurately whilst not requiring to be as small or as close together as is found with magnetic speech recording, so that, for instance, for a total course of 8000 yards only 400 yards of wire need be used, and when say, after 3500 yards a left turn is required the necessary signal is recorded at a point of the wire which is 175 yards distant from the start.

If the course of the torpedo or other craft has to be controlled in several directions, or if other operations are to be effected by means of a control according to this invention, as for instance stopping or starting of the driving motor or the emitting of luminous signals, several wires running in parallel and passing several separate pick-up devices respectively may be provided. For such an arrangement each wire constitutes the signal-carrier for a separate set of signals to be given, so that the number of wires depends on the number of devices to be influenced and therewith the number of operations to be effected. As in the case of a torpedo the desired number of signals to be given is limited, such a method is quite feasible for its control. For recording purposes each wire could have separate leads and coils, but the motor mentioned could be common to all.

In a modification according to the invention, a number of wires less than the number of separate sets of signals, or even a single wire may be used. The signals for the different operating devices are recorded on the wire by making use of the well known methods employed in the art of telephony, remote indication or carrier wave telegraphy. The signals may be recorded in the form of dashes and dots, or in the form of a plurality of groups of signals, each group modulating a carrier current, so that various modulated currents are superposed and transmitted through a single channel, being afterwards separated by suitable filters, or in any other suitable manner.

The pick-up devices will be influenced by the magnetized condition of the signal-carrier so that induction current impulses may be produced and suitable relays thereupon excited. The relays will be influenced by the number of impulses received or by the wavelengths of the modulated carrier-currents, so that the desired relay will be selected, and also the period of time will be fixed at which such relay is to act.

With the aid of a separate recording device inside the craft to be controlled, signals which are transmitted thereto in the form of electromagnetic waves, or waves of audible or supersonic frequency can be received and recorded on the carrier. For this purpose I employ a motor to drive the wire and provide means (one of the relay circuits for instance) for starting and stopping such motor and the wireless, supersonic or sound signals which have been received from a remote station or other outside transmitter source can be used at a later moment in the same manner as if the signal-carrier had been prepared before the start of the torpedo or other craft. So too any alteration of existing signals can be effected, for which purpose an eradication device in the form of a solenoid, when magnetizable wires or tapes are concerned, may be arranged at a suitable place so as to remove a desired part of the record magnetically.

The invention will be fully understood from the following description when read in connection with the accompanying drawings whereof:

Fig. 1 shows schematically one form of control system embodying the invention;

Fig. 2 is a detail of the construction which a signal-carrier as used in Fig. 1 may assume;

Fig. 3 represents a modification of the control system employing also a signal eradicating device associated with the signal-carrier;

Figure 4:
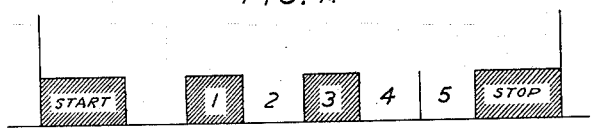
Fig. 4 is a diagram illustrating a composite code signal such as is particularly suitable for use with the modification according to Fig. 3.

Referring initially to Fig. 1, a signal-carrier in the form of magnetizable wire 10 is adapted to be uncoiled from a reel 11 and rewound upon a take-up reel 12 carried by a shaft 13, the latter being coupled for rotation at a speed directly proportional to a drive-shaft 14 through the intermediate gear 15 as shown.

The drive-shaft 14 is to be regarded as an element of the drive of a power driven torpedo or other power propelled craft or vehicle, and may, therefore, be part of the main engine or motor shaft of such vehicle. By means of the gear 15 in the arrangement shown, it will be seen that upon rotation of the shaft 14, the reel 12 will be driven at a speed lower than but directly proportional to that of the shaft 14, the wire 10 being simultaneously conveyed linearly in the direction indicated at a speed also directly proportional to that of the shaft 14 and hence substantially directly proportional to the speed of travel of the vehicle.

At a pre-arranged part of the wire 10 a magnetic signal record indicated by the part 16 is formed prior to installing the reel 11 on or within the vehicle, so that when the reel 12 has been driven to an extent corresponding to a predetermined distance of travel of the vehicle the part 16 is brought into signal transmitting relation to a signal responsive device comprising suitable magnetic pick-up members 17. Thereupon the members 17 may respond electromagnetically in known manner so as to energise a relay 18 having a lever armature 19 which is attracted when energisation of the relay 18 occurs. The attraction of the armature 19 will take place, therefore, substantially at the instant when a magnetic signal record formed on the pre-arranged part 16 of the wire 10 has been brought into signal transmitting relation to the pick-up members 17, and it is at this moment that the movement of the armature 19 can be utilized to initiate in any convenient manner a predetermined desired control or other operation of or by the vehicle. Moreover, it will be seen that if the pick-up members 17 receive from the wire 10 a succession of magnetic signals the relay 18 will become energised in response to each signal and the armature 19 will be attracted a corresponding numbers of times. In the arrangement illustrated the lever 19 is connected with pawl element 20 in operative engagement with a ratchet wheel 21 so as to advance the same in stages corresponding to the number of times the lever 19 has been attracted by the relay 18. Carried by the ratchet wheel 21 is a contact making arm 22 which is thereby adapted to make contact in turn with a number of circuit selector contacts 23. Each selector contact 23, when engaged by the arm 22, serves to complete a circuit through a relay (not shown) chosen to effect a selected desired operation such as, for instance, stopping or starting the driving motor or actuating the rudder to port or to starboard. It will be understood, of course, that the number of signals and their disposition along the wire 10 will be suited to the particular requirements in view for any prescribed journey which the vehicle is to make, and that owing to the provision shown for moving the wire 10 at a speed substantially directly proportional to the speed of travel of the vehicle the appropriate pre-arranging of the signals is rendered a simple matter.

Since the wire 10 in Fig. 1 need be composed of magnetizable material only at a part or parts thereof requiring to bear a magnetic signal record, it is in the interest of economy to use non-magnetizable material for forming the remainder or other parts of the wire on which no such signal record is to be carried. Fig. 2 represents a portion of signal-carrier wire thus formed where in an interval between two parts 10a of magnetizable material the intermediate joining section 10b is of suitable but desirably less expensive non-magnetizable material.

In the modification according to Fig. 3 the signal-carrier 10 may again be of the form and driven in the same manner described with reference to Fig. 1, the take-up reel 12 in this instance being shown at a different position, and the signals received by the pick-up member 17 being transmitted through a relay 30 which constitutes a main signal receiving relay of a selector system operating on a known so-called "start-stop" principle as used for example for teleprinting purposes.

The selector system represented in Fig. 3 embodies a distributor 31 adapted to receive and impart through a brush arm 32 code signals conforming in general to an $n$-unit code signalling system, based upon the ability to transmit suitable and numerous permutations of signals within a number equal to $2^n$. By such a method, code signals consisting of say, 5 or more impulses can be caused to transmit a great number of different signals. In the system illustrated the receiving brush arm 32 is arranged to be normally at rest but is maintained under constant torque tending to rotate it with the aid of any suitable constantly running motor driving it through a friction clutch. When a starting signal is given by the action of the relay 30 the distributor is energised, the brush arm 32 being then released and allowed to rotate. The constantly running motor can be a synchronous motor equipped with a centrifugal governor to hold it at constant speed as is well known in the art, whilst the speed at which the wire 10 is driven should bear a known relation to the speed of the synchronous motor. As the brush arm 32 sweeps over the transmitting face of the distributor, the impulses of say, the five unit code, will be transmitted selectively through a set of co-operating contacts as shown and pass current impulses causing the energisation of the desired selected number of selector magnets A, B, C, D, E and F, while the undesired number of the magnets A to F will not receive any current impulses. The particular arrangement shown in Fig. 3 is adapted for the transmission of eight different signals through selective action of the respective relays A—F and their consequent selective circuit-closing operations through the respective sets of contacts $a$—$f$ as shown, so as to give selective energisation to pilot devices 1 to 8 certain of which (when energised) then effect predetermined desired operations of or by the vehicle. At the end of each signal period a stop signal can be given which brings the distributor to rest until a new starting signal is given by another period of signals.

The nature of such composite code signals is represented more clearly in Fig. 4. Here, the periods 1 and 3 (shaded area) denote signals to be imparted whereas the periods 2, 4, 5 are blank and bear no signals. With the aid of such a code the pilot device which should respond and execute according to signals 1 and 3 would become energised and so effect the particular operation desired. Moreover, at the position of the pilot device 7, for example, suitable connections as shown in dotted outline (Fig. 3) may be made to a magnetic signal eradicating coil or device 33.

Figure 5:
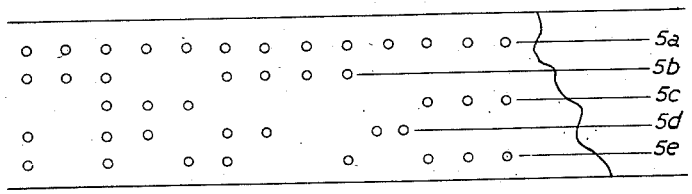
Fig. 5 illustrates an alternative way of determining code signals of the nature indicated by Fig. 4; whilst

Instead of segment distributors, simple mechanical devices having transmitting contacts could be actuated and single receiving magnets provided corresponding to such contacts. By using the 5 unit code as many as $2^5$ or 32 signals can be transmitted under the "start-stop" system and as an alternative mode of applying signals under this code system use may be made of mechanically perforated bands having the appearance represented for example in Fig. 5 wherein the perforations are arranged longitudinally in predetermined order along each of five rows designated 5a—5e.

When code signals such as are appropriate for working according to the "start-stop" system are received it is to be understood that the speed of the uncoiling wire, tape or plate should bear a certain relation to the revolving speed of the distributor. Therefore, as soon as the start signal has been given which releases the distributor a relay should be actuated which adjusts the speed of the signal-carrier corresponding to the speed of the distributor. As the time for the giving of signals is very limited— a matter of a few seconds—the requisite correspondence between the speed of the craft and the uncoiling signal-carrier does not become appreciably upset.

It is further to be understood that instead of the hereinbefore described "start-stop" code any other code could be used for selecting in manner well known in the art of telephony or remote control, for instance, the various relays of the appliances to be operated.

Figure 6:
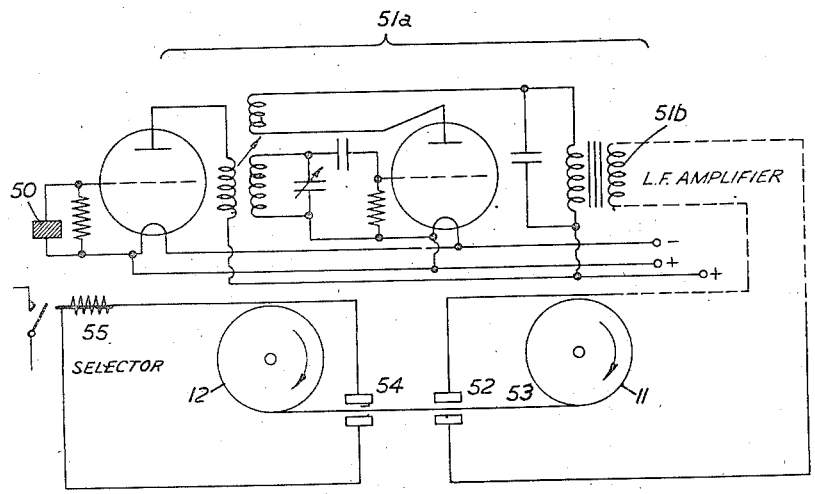
Fig. 6 shows a further modification of the system in which use is made of supersonic frequencies for the production of signals on the carrier.

A further modification of the system adapted for receiving supersonic or even wireless signals is represented in Fig. 6. Here a quartz microphone 50 adapted to receive supersonic signals may be connected to the input valve of a suitable high-frequency amplifier represented generally by 51a. The high-frequency signals thus received will be detected and amplified by a suitable low-frequency amplifier 51b as indicated. Thence, the amplified signal impulses will be received by a magnetic recording device 52 which acts on a blank wire 53 and effects the magnetic signal record thereon. The magnetised wire 53 which is driven by means of the take-up reel 12 will, therefore, bear all the signals sent to the quartz microphone 50 and can be received at a pick-up device 54 connected with a relay 55 so as to be imparted through a selector operating for example in the way previously described in connection with Fig. 3. For operation with wireless signals the quartz microphone 50 will have to be replaced by a suitable aerial whereas the action on the recording device will be unchanged.

As the initial speed of a torpedo depends partly upon the speed of the firing ship according to another feature of the invention the driving connection between the signal-carrier and motor may be effected through different gears, or the speed of the motor driving the signal-carrier can be regulated according to the speed of the ship. With the aid of suitable relays such regulation can be made automatically inside the torpedo. When the various relays are influenced by the number of impulses during a certain period, means should be provided to insure that the signal-carrier passes the relay at normal speed so long as signals are being given.

The existing regulating devices of torpedoes can be rendered suitable for exerting the control according to the present invention, so that it is not necessary to use several appliances for the same purpose.

Appliances known in the "Autopilot" art may be applied in combination with the present invention. The devices known hitherto for keeping a constant course of other known devices for controlling craft in combination with an Autopilot can be equally used in combination with a magnetic- or gyro-compass with the aid of the signals given by the signal-carrier according to the invention. As it is known to check the turning of a rudder with the aid of such a magnetic- or gyro-compass, as soon as the desired degree of turning has been reached it will be possible to combine these different methods; in such a case the desired degree of turning would be reached by influencing the different relays which would be subdivided at a certain number of points or degrees, and caused to act on the device which influences the Autopilot.

Another feature of the invention applicable to craft other than torpedoes consists in making a record of a desired course by driving the craft over this course, and at the same time recording every detail as to direction, speed and any other item on to a blank wire which uncoils as the craft progresses, so that all details of the course are recorded automatically at the correct place. Such a record can be re-recorded, in order to be placed in any other craft which will then repeat quite accurately the course the first craft has covered, if set in the same direction as the recording craft had.

Amplifiers may be incorporated in known manner wherever necessary.

Moreover, in order to facilitate the recording of the desired signals on to a carrier, samples of the signals most frequently used may be prepared in advance, so that only a re-recording of such samples at the correct places will need to be made.

It is to be understood, of course, that the arrangements shown in the drawings and hereinbefore described are purely schematic and illustrations of the principle involved, and that the invention is susceptible of embodiment in different forms without departing from the spirit of the invention and the scope of the appended claims.

What I claim is:

1. In a system for automatically controlling a power propelled craft during its course of travel, the combination upon said craft of signal transmitting apparatus including a signal-carrier consisting of elongated, flexible material, a reel for coiling said carrier thereupon, means for rotating said reel at a speed proportional to the speed at which the craft is driven, said carrier having a plurality of code-signals thereon, signal responsive pick-up means disposed adjacent the path of movement of said carrier onto said reel and so as to receive said code-signals passing in succession thereby, a relay energized in accordance with and common to all the code-signals received by said pick-up means, a plurality of pilot devices each adapted to respond to a particular one of said code-signals and effect a particular control influence of said craft, and code selector means interposed between said relay and said pilot devices for determining which of said pilot devices is to respond.

2. A system according to claim 1, wherein the code selector means comprise selectively operable means operating as a telemetering "start-stop" system as and when any of the code-signals are received by the relay.

3. A system according to claim 1, characterised in that one of the pilot devices has connections for energising a signal eradicating device disposed adjacent the signal-carrier at a position between the signal responsive means and the reel.

4. In a control apparatus for a power driven craft, a movable signal-carrier on said craft and means for moving said carrier at a speed substantially proportional to that at which the craft is moved, means for receiving and detecting from a source external to said craft code-signals of supersonic frequency, means including an amplifier of the detected code-signals for effecting a code record of said signals on said carrier during movement of said carrier, and code selector means responsive to said recorded signals for selectively determining a control influence on an operating condition of the craft corersponding to the selection made by said code selector means.

5. In a system for automatically controlling a power propelled craft during its course of travel, the combination upon said craft of signal transmitting apparatus including a plurality of n-unit magnetic code-signals recorded thereon at different pre-arranged parts thereof, a magnetic signal responsive device, means for effecting a relative movement between said carrier and said device so as to bring said magnetic code-signals progressively in turn into signal transmitting relation to said device, and automatically operable "start-stop" selector means responsive to the code-signals received by said device for modifying operating conditions of said craft in accordance with the particular code-signals received, said first-mentioned means being arranged to effect said relative movement at a speed bearing a substantially constant relation to the speed at which the craft is propelled, in order to ensure the modifying of said operating condition taking place automatically through said "start-stop" selector means at predetermined points in the course of travel of said craft.

6. In combination, a power driven craft and signal transmitting apparatus thereon including a signal-carrier consisting of perforatable strip material, means for driving and conveying said carrier in a longitudinal direction at a speed substantially proportional to the speed at which said craft is driven, said carrier having perforations formed therein in pre-arranged disposition so as to provide predetermined $n$-unit code-signals thereon, signal detection means disposed at a position adjacent the path of movement of said carrier and adapted through selection of said $n$-unit code-signals to establish modified operations of said craft in accordance with the particular code-signal that is being detected by said signal detection means.

HANS SAMUEL JOACHIM.